(12) United States Patent
Babinsky et al.

(10) Patent No.: US 6,666,081 B1
(45) Date of Patent: Dec. 23, 2003

(54) SENSOR PROBE

(76) Inventors: Holger Babinsky, Cambridge University Engineering Dept., Trumpington Street, Cambridge CB2 1PZ (GB); Colm Durkan, Cambridge University Engineering Dept., Trumpington Street, Cambridge CB2 1PZ (GB); Howard Hodson, Cambridge University Engineering Dept., Trumpington Street, Cambridge CB2 1PZ (GB); Mark Welland, Cambridge University Engineering Dept., Trumpington Street, Cambridge CB2 1PZ (GB); Robert Howell, Darwin College, Cambridge CB3 9EU (GB); Uwe Kuschel, Habacher Str. 68, 81377 Muenchen (DE); David Moore, Cambridge University Engineering Dept. Trumpinton Street, Cambridge CB2 1PZ (GB)

( * ) Notice: Subject to any disclaimer, the term of this patent is extended or adjusted under 35 U.S.C. 154(b) by 0 days.

(21) Appl. No.: 10/070,851
(22) PCT Filed: Sep. 8, 2000
(86) PCT No.: PCT/GB00/03479
§ 371 (c)(1), (2), (4) Date: Jul. 9, 2002
(87) PCT Pub. No.: WO01/20344
PCT Pub. Date: Mar. 22, 2001

(30) Foreign Application Priority Data

Sep. 10, 1999 (GB) .............................. 9921489

(51) Int. Cl.$^7$ ............................................. G01W 1/00
(52) U.S. Cl. .................... 73/170.01; 73/170.14; 73/861.42; 73/861.46; 73/861.49
(58) Field of Search ................... 73/170.01, 170.14, 73/861.42, 861.46, 861.49, 632

(56) References Cited

U.S. PATENT DOCUMENTS

| | | | | | |
|---|---|---|---|---|---|
| 3,719,080 | A | * | 3/1973 | Burgess | 73/861.34 |
| 4,077,394 | A | * | 3/1978 | McCurdy | 600/18 |
| 4,703,661 | A | * | 11/1987 | Evers | 73/861.66 |
| 4,736,618 | A | * | 4/1988 | Usami et al. | 73/31.05 |
| 4,833,917 | A | * | 5/1989 | Wilson | 73/170.14 |
| 5,023,549 | A | * | 6/1991 | Dau et al. | 324/220 |
| 5,439,579 | A | * | 8/1995 | Koide et al. | 204/422 |
| 5,445,725 | A | * | 8/1995 | Koide et al. | 205/790 |
| 5,460,047 | A | | 10/1995 | Jacobson | |
| 5,811,691 | A | * | 9/1998 | Jackson | 73/861.65 |

FOREIGN PATENT DOCUMENTS

| | | |
|---|---|---|
| DE | 4017877 | 10/1995 |
| WO | WO 9520166 | 7/1995 |

\* cited by examiner

*Primary Examiner*—Edward Lefkowitz
*Assistant Examiner*—Andre Allen
(74) *Attorney, Agent, or Firm*—Hogan & Hartson L.L.P.

(57) ABSTRACT

An elongate probe suitable for measuring one or more properties of a stream of fluid, the probe having an external planar sensing surface, which in use is exposed to the stream of fluid, at a longitudinal end thereof and comprising a plurality of sensors at the planar external sensing surface.

18 Claims, 4 Drawing Sheets

SENSOR PROBE

The present invention relates to probes for measuring the properties of a stream of fluid.

The measurement of fluids is important in many areas of science. For example, knowledge of the fluid properties is important in the fluid flows inside turbomachines (for example jet engines and pumps), in the fluid flows over aircraft or road vehicles and in the fluid flows inside pipes or ventilation ducts.

The fluid properties in flows of gases and liquids of interest include: flow direction, pressure, temperature, speed, concentration of constituent parts. The fluid flows may have particles or droplets suspended in the flow, in which case it may be desirable to determine the size, the speed or the number per unit volume of the particles or droplets. There is also interest in the measurement of unsteady flows such as those found in turbomachines or in pipes, as well as the measurement of steady fluid flows.

It is often desirable to measure the properties of the flowing fluid at a known distance from the surface of the subject over which it is flowing. Known probes for this purpose comprise an elongate probe with the sensing head i.e. the part which is exposed to the fluid flow located at a distal end thereof to provide the desired spacing of the sensing surface of the probe from the surface of the subject of interest over which the fluid flows.

Conventional probes have sensing heads based on three-dimensional aerodynamic shapes. Examples are sensing heads having hemispherical sensing surfaces, and frusto-conical and multi-faceted frusto-pyramid sensing surfaces where the apexes are pointed toward the oncoming flow.

Multiple measurements are required when more than one quantity is to be determined. The probes discussed above all employ a sensing head having a plurality of surfaces each provided with an associated sensor and facing in different directions, such as the hemispherical sensing head, the frusto-conical sensing head and the multi-faceted frusto-pyramid sensing head, in order to determine the direction of the fluid flow by comparing the signals from the sensors associated with each of the surfaces.

The present invention was based on the finding that the flow direction of a fluid and other flow properties of a fluid can also be determined using a probe having a planar sensing surface with a plurality of sensors at different positions of the planar sensing surface.

According to a first aspect of the present invention, there is provided an elongate probe for measuring one or more properties of a stream of fluid, the probe having an external planar sensing surface, which in use is exposed to the stream of fluid, at a longitudinal end thereof and comprising a plurality of sensors at the planar external sensing surface.

According to a second aspect of the present invention there is provided the use of the above elongate probe for measuring one or more properties of a stream of fluid.

According to a third aspect of the present invention, there is provided a method of measuring one or more properties of a stream of fluid using the above elongate probe, the method comprising positioning the probe in the stream of fluid such that the stream of fluid flows directly over the external planar sensing surface.

The sensors are preferably located such that the sensitive element of each sensor lies in or substantially in the plane of the planar sensing surface. This reduces the time for the sensors to respond to changes in the flow properties of the fluid, which is particularly important for detecting transient flow changes. The sensitive elements of the individual sensors may be placed flush with the external planar sensing surface, or alternatively, they may be placed within the body of the sensing head just below the sensing surface, or placed just above the sensing surface.

The feature that the sensing surface is planar does not exclude the provision of flow manipulation microstructures on the planar sensing surface, provided that such structures do not significantly affect the response time of the sensors. The advantages of providing such flow manipulation microstructures are discussed in detail below.

Embodiments of the present invention will now be described hereunder, by way of example only, with reference to the accompanying drawings, in which.

Figure 1:
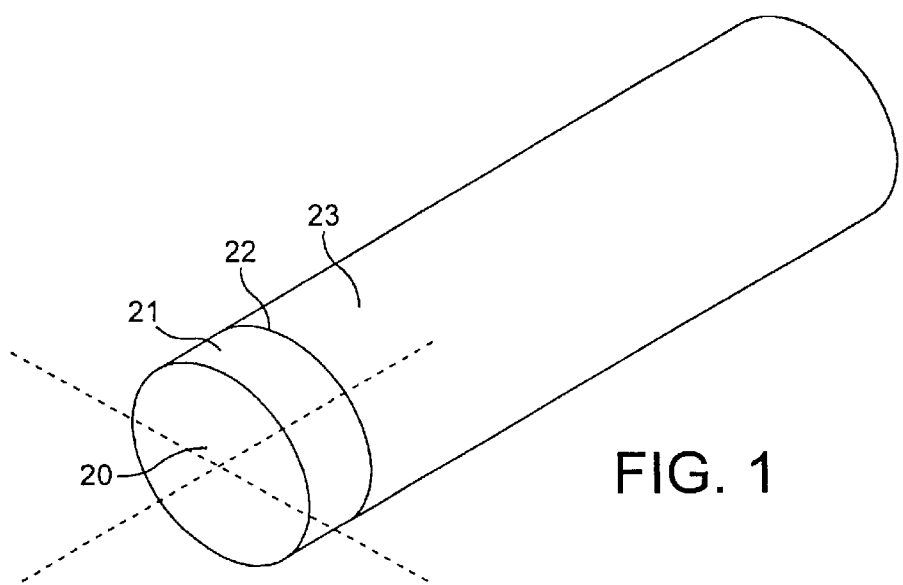
FIG. 1 is a schematic perspective view of a cylindrical probe according to a first embodiment of the present invention.

As mentioned above, the present invention is based on the finding by the inventors of the present invention that when a fluid flow is directed against a planar surface, there is a variation in pressure at different points of the planar surface, the nature of the variation depending on the fluid properties of the flow such as the angle of the fluid flow with respect to the planar sensing surface. Such variation in pressure at different points of the planar sensing surface can be detected by arranging individual sensors at different points of the planar sensing surface and comparing the signals output from each sensor. The probe can be calibrated by exposing it to a variety of flow conditions having differing flow properties such as direction, pressure and Mach number, whereafter the probe can be used to determine the flow properties of an unknown fluid flow by comparison of the measurement results for the unknown fluid flow with the measurements obtained in calibration.

By the appropriate selection of sensors at the planar sensing surface, other properties of the fluid flow can be determined such as the Mach number, the temperature, the speed, the density, the size of particles or the number of fluid flows. Sensors of similar or different types may be combined to measure some or all of these quantities.

As mentioned above, the planar sensing surface may also be provided with one or a plurality of flow manipulation microstructures on the portions of the planar sensing surface between the sensors. Preferably, these microstructures do not surround all the sensors on the planar sensing surface. The flow manipulation microstructures function to enhance the sensitivity of the probe to the quantities being measured, without significantly affecting the response time of the sensors. The flow manipulation structures may be fixed structures. Alternatively, they may be fitted to the planar sensing surface such that their shape and/or position can be altered in use by actuators fitted to the sensing head.

The sensing head may also be provided with transmitters whose transmission can affect, or be affected by, the fluid flow. The fluid properties of the fluid flow or changes in the fluid properties can then be detected by using the sensors to detect changes in the transmission caused by interactions with the fluid flow or changes in the properties of the fluid flow caused by its interaction with the transmission from the transmitters. Examples of transmitters for this purpose include optical transmitters which can transmit an optical beam away from the planar sensing surface towards the fluid flow. The provision of optical sensors at the planar sensing surface can then be used to detect light transmitted by the optical transmitters and reflected back towards the planar sensing surface by particles in the fluid flow, thereby providing an indication of the concentration and size of particles in the fluid flow. The optical transmitter could itself also function as the optical sensor, such as would be possible in the case of using an optical fiber extending to the planar sensing surface. Alternatively, acoustic transmitters may also be used.

FIG. 1 is a schematic perspective view of a cylindrical probe according to a first embodiment of the present invention. A cylindrical sensing head 21 is shown schematically as fitted to the tip 22 of an elongate cylindrical support 23 of the same diameter as the sensing head. The sensing head has a planar sensing surface 20 which is the surface intended to be exposed to the fluid flow. Although not shown in FIG. 1, the sensing head 21 is provided with a plurality of sensors at various positions of the planar sensing surface as shown, for example, in FIGS. 4 to 10. The diameter of the sensing head is preferably no greater than 5 mm, and further preferably no greater than 1 mm, to provide a high degree of pressure differentiation across the planar sensing surface when placed in a fluid flow.

Figure 2:
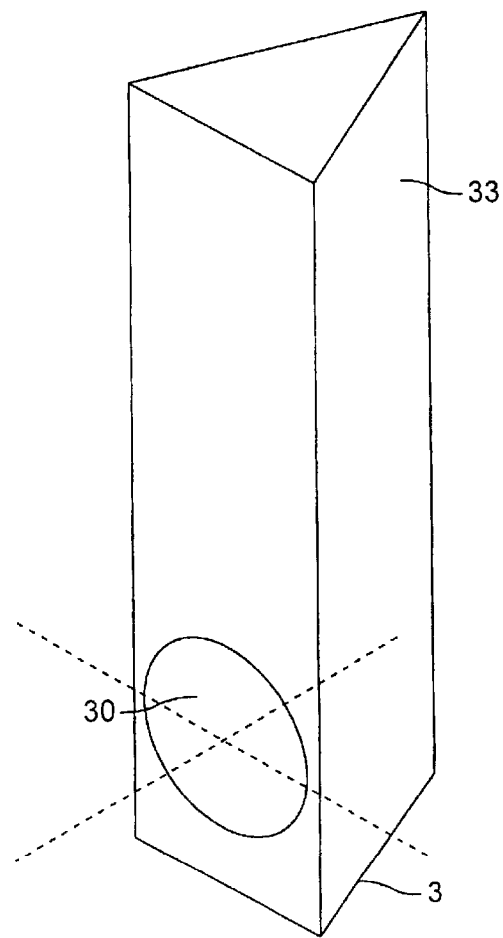
FIG. 2 is a schematic perspective view of a triangular probe according to a second embodiment of the present invention.

FIG. 2 is a schematic perspective view of a probe according to a second embodiment of the present invention. A cylindrical sensing head 30 having a planar sensing surface is embedded into the longitudinal end 32 of a support 33 having a triangular cross-section, such that the planar sensing surface is flush with the external surface of the support 33. The sensing head is provided with a plurality of sensors at the planar sensing surface, as shown for example in FIGS. 4 to 10.

Figure 3:
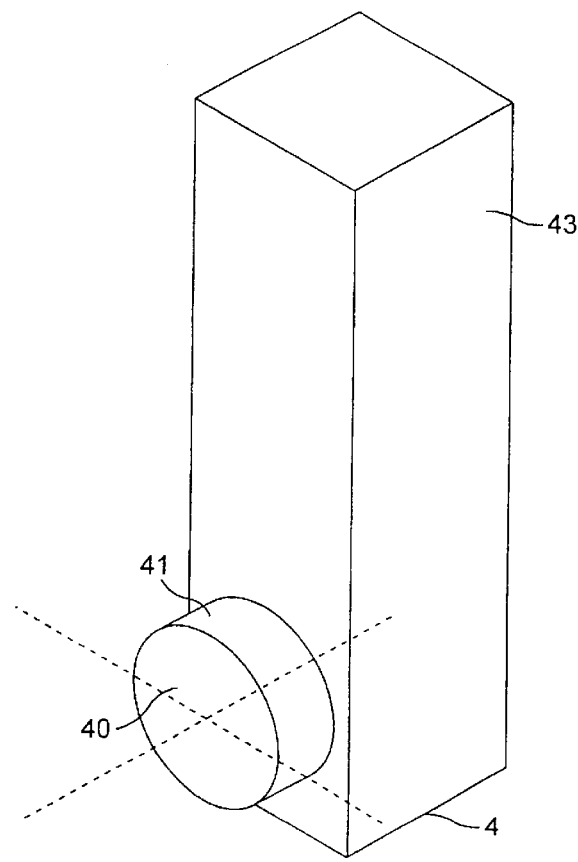
FIG. 3 is a schematic perspective view of a rectangular probe according to a third embodiment of the present invention.

FIG. 3 is a schematic perspective view of a probe according to a third embodiment of the present invention. A cylindrical sensing head 41 having a planar sensing surface 40 is fitted at a longitudinal end 42 of an elongate support 43 having a square cross-section. The sensing head 41 is provided with a plurality of sensors as, for example, shown in FIGS. 4 to 10.

Figure 4:
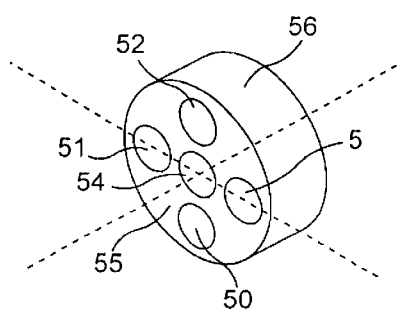
FIG. 4 is a schematic perspective view of a sensing head for use in the probes shown in any of FIGS. 1 to 3.

FIG. 4 is a schematic perspective view of an example of a planar sensing head 56 for use in the probe shown in FIGS. 1 to 3. The sensing head has five sensors 50–54 at a planar sensing surface 55, comprising four periphery sensors 50–53 arranged around a central sensor 54.

Figure 11:
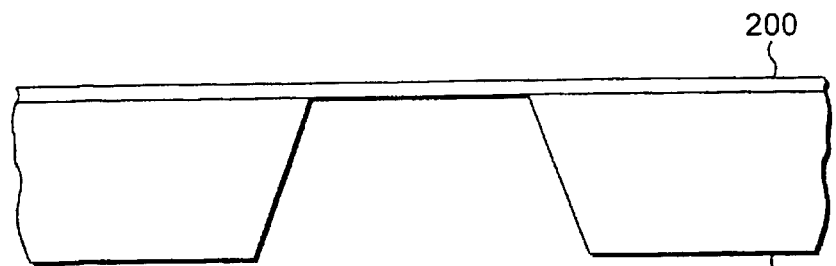
FIG. 11 is a schematic cross-sectional view of a diaphragm sensor.

The individual sensors may be manufactured using micron scale manufacturing technologies. For example, micro-machining and micro-fabrication techniques can be used to manufacture a micro-electro-mechanical system (MEMS), such as a silicon-based pressure sensor as shown in FIG. 11. In the structure shown in FIG. 11, a silicon nitride diaphragm 200 is provided on a silicon support 210. This structure may be produced by forming a silicon nitride layer of appropriate thickness on a silicon substrate, and then selectively etching the silicon subtrate from the side opposite to the silicon nitride layer down to the silicon nitride layer. As mentioned above, since the probe of the present invention has a planar sensing surface, it can be easily manufactured from a single planar silicon subtrate by creating a plurality of diaphragms at appropriate points of the silicon subtrate.

The total momentum transferred per second, which is the pressure acting on the sensor area, mechanically deflects the silicon nitride diaphragm. In one arrangement, the degree of deflection of the diaphragm is measured by electrical or electromagnetic methods; for example, the diaphragm may have piezo-electric resistors incorporated into it and the change in resistance of the resistors gives a measure of the pressure acting on the diaphragm. Alternatively, the degree of deflection of the diaphragm may be sensed using optical means such as fibre-optic light sources coupled to an interferometer.

Figure 5:
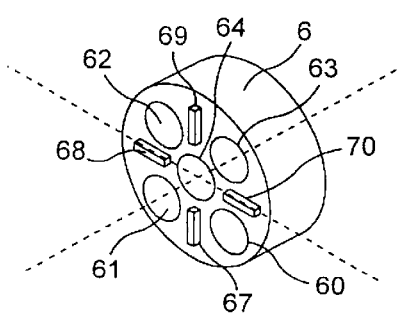
FIG. 5 is a schematic perspective view of another sensing head for use in the probes shown in any of FIGS. 1 to 3.

FIG. 5 is a schematic perspective view of another planar sensing head 66 for use in the probes shown in FIGS. 1 to 3. It is the same as the sensing head shown in FIG. 4 except that it is provided with a plurality of elongate flow manipulation microstructures 67–70 formed between the sensors 60–64 on the planar sensing surface 65. The four flow manipulation microstructures (67–70) are arranged to increase the sensitivity of the probe to changes in flow direction, but without significantly affecting the response time of the sensors. They preferably have a height of no greater than about 0.3 mm, and further preferably no greater than about 0.1 mm. In general terms, they preferably have a height no greater than about 10% of the diameter of the planar sensing surface. The flow manipulation devices may be designed such that their shape or position on the sensing surface can be altered in use by suitable actuating means based, for example, on piezo-electric effects or electromagnetic forces. The flow manipulation devices may also be adapted such they can be used to inject extra fluid or particles into the main fluid flow. This injection is preferably periodic to allow phase-sensitive detection at the sensors.

The flow manipulation micro-structures can be made by standard microfabrication techniques such as electrodeposition or vapour deposition, lithography and etching.

Figure 6:
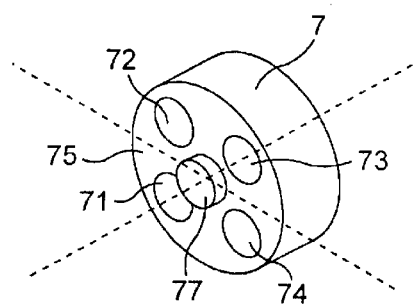
FIG. 6 is a schematic perspective view of another sensing head for use in the probes shown in any of FIGS. 1 to 3.

FIG. 6 is a schematic perspective view of another sensing head for use in the probes shown in FIGS. 1 to 3. The cylindrical sensing head 76 has a planar sensing surface 75 provided with four ultrasonic sensors 71–74 flush with the planar sensing surface 75. The four sensors 71–74 are arranged around a central transmitter 77. If the transmitter is an ultrasonic transmitter, then the differences in the times of arrival at the four sensors of the ultrasonic waves emitted by the transmitter may be used to determine the direction of the fluid flow, the speed of the fluid flow and the temperature of the fluid flow. If the transmitter is adapted for injecting pulses of test fluid or particles into the main fluid, timing of the responses at the four sensors may be used to determine the properties of the main flow.

Figure 7:
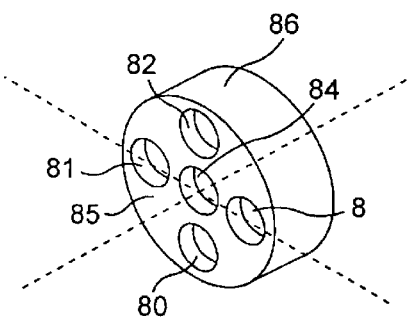
FIG. 7 is a schematic perspective view of another sensing head for use in the probes shown in any of FIGS. 1 to 3.
Figure 12:
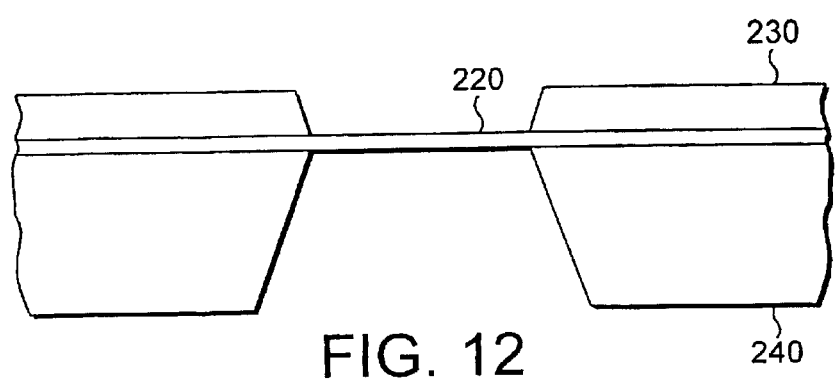
FIG. 12 is a schematic cross-sectional view of another diaphragm sensor.

FIG. 7 is a schematic perspective view of another sensing head 86 for use in the probes shown in FIGS. 1 to 3. This sensing head is the same as that shown in FIG. 4 except that the sensitive elements of the sensors 80–84 are arranged just below the planar sensing surface 85. Such a sensing head can be easily manufactured by using micro-machined diaphragm sensors having the structure shown in FIG. 12. In FIG. 12, a silicon oxide diaphragm 220 is sandwiched between silicon supports 230, 240. The upper silicon support 230 whose upper surface defines the planar sensing surface in the probe typically has a thickness of about 5 microns. This structure can be produced by depositing a silicon oxide layer of appropriate thickness on a silicon substrate, and then forming a silicon layer on the side of the silicon oxide layer opposite the silicon substrate. The silicon substrate and silicon layer are then selectively etched down to the silicon oxide layer. The sensors 80–84 may be covered with one or more protective layers to prevent damage being caused by particles or droplets in the flow.

Figure 8:
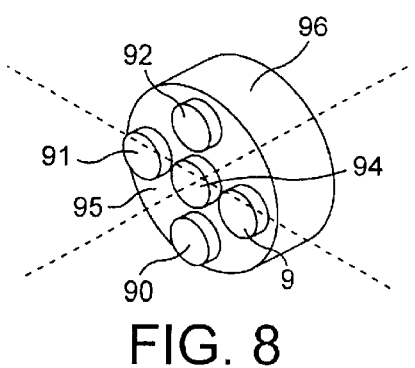
FIG. 8 is a schematic perspective view of another sensing head for use in the probes shown in any of FIGS. 1 to 3.

FIG. 8 is a schematic perspective view of another planar sensing head for use in the probes shown in FIGS. 1 to 3. This sensing head 96 has five sensors 90–94 that are mounted just above the planar sensing surface 95. The five sensors 90–94 comprise four periphery sensors 90–93 arranged about a central sensor 94. An example of such a sensing head is one in which the sensors 90–93 are hot-wire sensors comprising wires arranged on the planar sensing surface which are heated by passing electrical currents through them. The hot wires can be arranged directly on the planar sensing surface or supported a minute distance above the planar sensing surface. The temperature of these wires will depend on the properties of the fluid flow and the properties of the fluid flow can therefore be determined by measuring the electric potential across the wires. A probe fitted with this head may be used to determine the direction, the speed and the temperature of a fluid flow.

Figure 9:
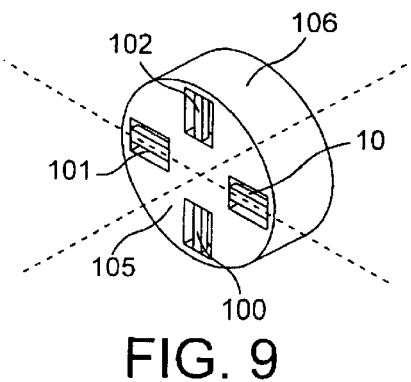
FIG. 9 is a schematic perspective view of another sensing head for use in the probes shown in any of FIGS. 1 to 3.

FIG. 9 is a schematic perspective view of another sensing head for use in the probes shown in FIGS. 1 to 3. This sensing head 106 consists of four hot wire sensors 100–103 as described above mounted to be flush with the planar sensing surface 105. The four sensors 100–103 are arranged around the central point of the planar sensing surface 105.

Figure 10:
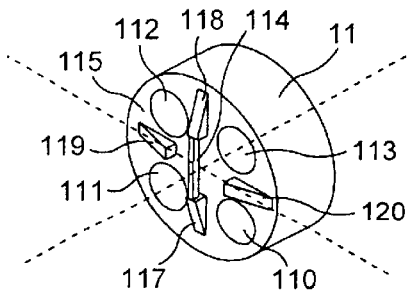
FIG. 10 is a schematic perspective view of another sensing head for use in the probes shown in any of FIGS. 1 to 3.

FIG. 10 is a schematic perspective view of another sensing head for use in the probes shown in FIGS. 1 to 3. This sensing head consists of a single sensor of one type 114 that is supported a minute distance above the planar sensing surface 115 by flow manipulation microstructures 117–118 formed on the planar sensing surface 115 and having a height of no greater than about 0.3 mm, and preferably no greater than about 0.1 mm. Four sensors 110–113 of a second type are provided with their sensitive elements flush with the planar sensing surface 115. These four sensors 110–113 may be diaphragm sensors having the structure shown in FIG. 11. The diaphragms may be modified by coating with sensitive layers to adsorb or desorb gas to achieve particular chemical sensitivities. The four sensors 110–113 of the second type are arranged around the central sensor 114. Two further flow manipulation microstructures 119–120 are arranged between the sensors 110–113. The flow manipulation microstructures 117–120 are arranged to increase the sensitivity of the probe to changes in flow direction. The particular flow manipulation microstructures 117–120 are shown as wedge-shaped structures but other shapes may be used. The central sensor 114 may be a hot wire sensor comprising a heated wire supported above the planar sensing surface by the flow manipulation microstructures 117, 118, and may be used to measure the temperature of the fluid flow. The four periphery sensors 110–113 may be used to measure the pressure and the direction of a fluid flow.

What is claimed is:

1. An elongate probe suitable for measuring one or more properties of a stream of fluid, the probe having an external planar sensing surface, which in use is exposed to the stream of fluid, at a longitudinal end thereof and comprising a plurality of sensors at the planar external sensing surface, and one or more flow manipulation microstructures formed on portions of the external planar sensing surface between the pressure sensors to enhance the sensitivity of the probe to the properties being measured.

2. An elongate probe according to claim 1, wherein the sensors are pressure sensors.

3. An elongate probe according to claim 1, wherein the flow manipulation microstructures are fitted to the planar sensing surface such that their shape and/or position can be altered in use.

4. An elongate probe according to claim 1, wherein the flow manipulation microstructures are adapted for the injection of extra fluid or particles into the fluid stream.

5. An elongate probe according to claim 1, wherein the probe comprises an elongate support structure and a sensing head attached to a longitudinal end of the elongate support structure, the external planar sensing surface being located on the sensing head.

6. An elongate probe according to claim 5, wherein the sensing head is of a generally cylindrical shape having a first longitudinal end attached to the elongate support structure and an opposite second longitudinal end protruding from the elongate support structure, the planar surface of the cylindrical sensing head at the second longitudinal end defining the external planar sensing surface.

7. An elongate probe according to claim 6, wherein the elongate support structure is a cylindrical structure, and the cylindrical sensing head has the same diameter as the cylindrical support structure and is co-axially attached to the cylindrical support structure on a longitudinal lip of the cylindrical support structure.

8. A method of measuring one or more properties of a stream of fluid using an elongate probe according claim 6, the method comprising positioning the probe in the stream of fluid such that the stream of fluid flows directly over the external planar sensing surface.

9. An elongate probe according to claim 7, wherein the external planar sensing surface has a diameter of less than 5 mm.

10. An elongate probe according to claim 9, wherein the external planar sensing surface has a diameter of less than 1 mm.

11. An elongate probe according to claim 1, wherein each sensor has a sensitive element lying in or substantially in the plane of the external planar sensing surface.

12. An elongate probe according to claim 1, wherein the probe further comprises transmitters at the external planar sensing surface.

13. An elongate probe according to claim 12, wherein the transmitters are adapted for injecting a test fluid into the stream of fluid whose properties are to be measured.

14. An elongate probe according to claim 13, wherein the response time of the probe to changes in the stream of fluid is less than 50 ms.

15. An elongate probe according to claim 14, wherein the response time of the probe to changes in the stream of fluid is less than 10 ms.

16. An elongate probe according to claim 1, wherein at least four sensors are provided at the planar external sensing surface.

17. An elongate probe according to claim 15, wherein at least four sensors are provided at the planar external sensing surface.

18. A method of measuring one or more properties of a stream of fluid using an elongate probe according claim 1, the method comprising positioning the probe in the stream of fluid such that the stream of fluid flows directly over the external planar sensing surface.

* * * * *

UNITED STATES PATENT AND TRADEMARK OFFICE
CERTIFICATE OF CORRECTION

PATENT NO. : 6,666,081 B1
DATED : December 23, 2003
INVENTOR(S) : Babinsky et al.

It is certified that error appears in the above-identified patent and that said Letters Patent is hereby corrected as shown below:

<u>Title page,</u>
Item [75], should read as follows:
-- Inventors: Holger Babinsky, Cambridge University Engineering Dept., Trumpington Street, Cambridge CB2 1PZ (DE)
David Moore, Cambridge University Engineering Dept., Trumpington Street, Cambridge CB2 1PZ (UK) --

Signed and Sealed this

Second Day of March, 2004

JON W. DUDAS
*Acting Director of the United States Patent and Trademark Office*